No. 624,822. Patented May 9, 1899.
H. KISTER.
SELF FEEDER FOR THRESHING MACHINES.
(Application filed Oct. 13, 1898.)
(No Model.) 2 Sheets—Sheet 2.
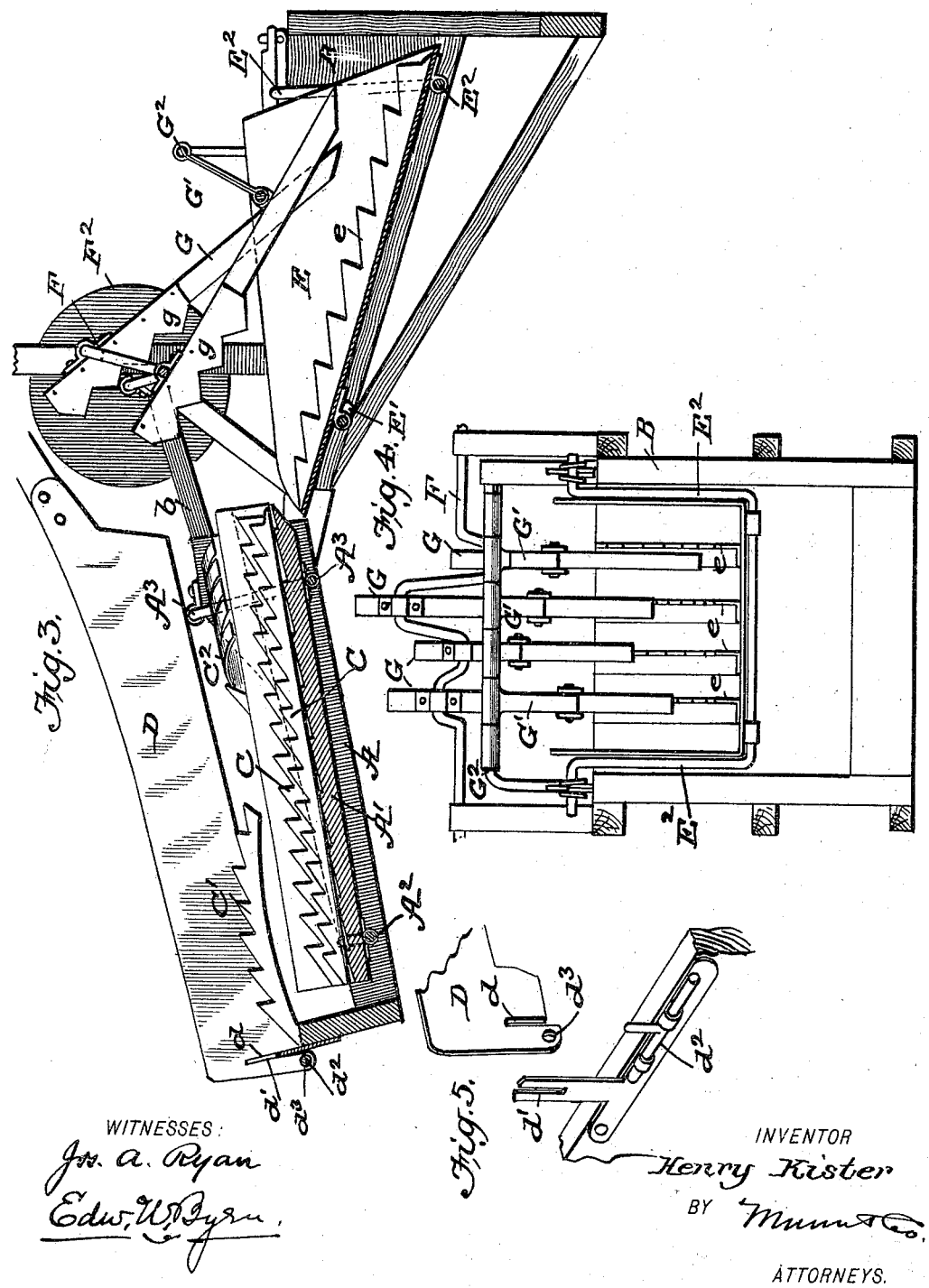
WITNESSES:
Jos. A. Ryan
Edw. W. Byrn.
INVENTOR
Henry Kister
BY Munn & Co.
ATTORNEYS.

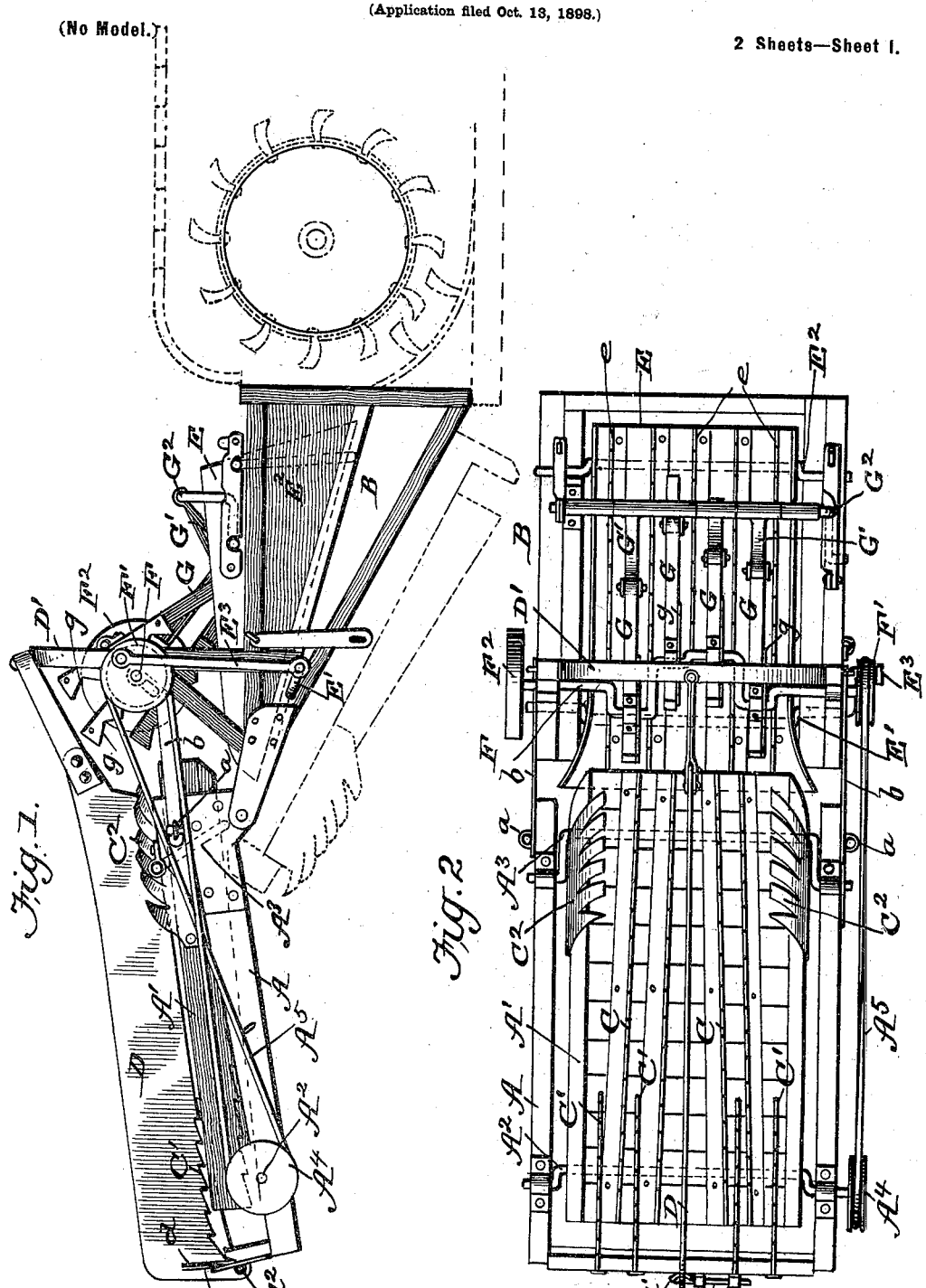

UNITED STATES PATENT OFFICE.

HENRY KISTER, OF MORRISON, MISSOURI.

SELF-FEEDER FOR THRESHING-MACHINES.

SPECIFICATION forming part of Letters Patent No. 624,822, dated May 9, 1899.

Application filed October 13, 1898. Serial No. 693,411. (No model.)

*To all whom it may concern:*

Be it known that I, HENRY KISTER, of Morrison, in the county of Gasconade and State of Missouri, have invented a new and useful Improvement in Self-Feeders for Threshing-Machines, of which the following is a specification.

The object of my invention is to provide an automatic feeder for threshing-machines designed to rapidly and evenly feed the bundles of grain to the threshing-cylinder in straight position and without choking and also to cut the bundles as they are fed; and it consists in the peculiar construction and arrangement of the same which I will now proceed to describe, with reference to the drawings, in which—

Figure 1 is a side elevation; Fig. 2, a plan view. Fig. 3 is a longitudinal vertical section; Fig. 4, a rear end view, and Fig. 5 is a detail.

The self-feeder is made in two main parts A and B, hinged together, and the part A is adapted to be folded under B for more compact transportation, as seen in dotted lines in Fig. 1. When disposed for use, as shown in full lines in Fig. 1, the two parts are held stiffly in position by brace-bars $b$ and staples $a$, which receive a peg after the manner of a hasp and staple.

The part B is a boxing or casing of a generally triangular shape, the wider end of which fits against the front end of the thresher and is suitably secured thereto by hasp and staple or other convenient attachment.

The front part A is a rectangular frame, having inside the same a receiving feed-bed A', mounted upon two transverse crank-shafts $A^2 A^3$. The forward crank-shaft $A^3$ has the longer cranks and merely vibrates or rocks, while the rear one next to the receiving end has short cranks and revolves from the action of a pulley $A^4$, driven by a cross-belt $A^5$. The bottom of the feed-bed is armed with a series of longitudinally-arranged saw-teeth C, pointing forwardly, and between these are a set of fixed and curved bars or blades C', having forwardly-pointing teeth on their upper edges. These toothed bars are attached to the end bar of the frame A and serve to hold the bundles while the teeth C of the vibrating bed move backward under the same to get a new hold. The vibrating bed has also inwardly-curved fingers $C^2$ along its sides to hold the bundles on and prevent them from falling over the sides.

D is a detachable bundle-straightener and brace. This is a broad plate arranged longitudinally over the top of the feed-bed A', connected at its upper end to a bail D', rising from the portion B of the feeder and having at its other end a slot $d$, that drops over a forked standard $d'$ and is there secured by a sliding bolt $d^2$, entering a hole $d^3$ on the plate. The purpose of this plate is to compel the bundles of grain as they are thrown onto the vibrating bed to assume a longitudinal position thereon and be fed endwise to the thresher. It also acts incidentally as a brace for the bed. When the feeder is to be detached and folded for transportation, the locking-bolt $d^2$ is withdrawn and the plate is detached from the bed.

In the part B of the feeder there is a vibrating hopper E, having rows of forwardly-inclined teeth $e$ in its bottom, and above these there is a series of pressing and cutting blades. The hopper E is supported upon two crank-shafts $E' E^2$, of which $E^2$ has long cranks and oscillates, while $E'$ has short cranks and rotates, power being imparted thereto by a connecting-rod $E^3$ (or a belt) from a pulley F' on a main crank-shaft F, driven by a drive-pulley $F^2$. The motion of these two crank-shafts feeds the bundles down the hopper directly to the threshing-cylinder. It will be seen that in both the vibrating receiving-bed A' and the vibrating hopper E the receiving ends of these two working parts are carried upon the short crank-arms of revolving shafts $A^2$ and E', respectively, while the discharge ends of said parts are carried upon the long crank-arms of rock-shafts $A^3 E^3$. This is an important feature in that the receiving end of each part is given (in addition to its horizontal throw) a quick short vertical motion that enables bed A' to take onto itself the bundles from the stationary arms C' and the hopper E to take onto itself the bundles from the receiving-bed A', while the long crank-arms of a rock-shaft at the rear ends of these parts give a horizontal motion with scarcely any vertical motion that holds the discharge end of one part in right relation to the receiving end of the other part to give the best progressive movement of the bundles and the most effective discharge. The several cranks of the main shaft F are provided with inclined pressing and cutting bars G, whose lower and forward ends are loosely sustained at points above their lower ends by jointed individual hangers G' from a transverse supporting-bar G². These bars G have sharp sickle-edged blades $g$ on their upper ends, which as the bundles pass under the same cut with a pressing or shearing action the bands with which the sheaves of grain are bound, and thus loosen the bundle, so that it can pass freely through the thresher, while the lower pointed ends of these bars stick into these bundles and discharge them out of the hopper.

The operation of my invention is as follows: The bundles are pitched onto the bed on each side of the straightening-blade and are fed forward by the joint action of the vibrating bed with teeth and the stationary toothed arms, being straightened as they move forward by the broad longitudinal blade. When the bundles reach the part B of the feeder, they pass into the vibrating hopper, and by the action of its forwardly-inclined teeth are fed down to the threshing-cylinder, the bundles being cut as they descend through the hopper by the shearing action of the cutting-blade above.

In large machines the front feed-bed A may be made in two parts, if desired.

Having thus described my invention, what I claim as new, and desire to secure by Letters Patent, is—

1. In a feeder for threshing-machines a receiving-table consisting of a stationary frame A having at its receiving end curved overhanging stationary arms C' provided with forwardly-inclined teeth, and a vibrating bed A' arranged beneath the same and having a series of forwardly-inclined teeth alternating with those of the stationary arms, and at its delivery end having laterally and inwardly projecting teeth C², said table being at its receiving end combined with and mounted on the short crank-arms of a revolving shaft A² and at its delivery end upon the long crank-arms of a rock-shaft A³ substantially as and for the purpose described.

2. In a feeder for a threshing-machine, the combination with a stationary frame A having a vibrating bed A' with forwardly-inclined teeth and a rear frame B; of a bail D', a detachable sheaf-straightening plate D attached thereto and formed at the other end with slot $d$ and perforation $d^3$, the forked standard $d'$ adapted to receive the slot $d$ of the plate, and a bolt $d^2$ arranged to enter the perforation $d^3$ in the plate to hold the plate detachably in place above the vibrating bed substantially as and for the purpose described.

HENRY KISTER.

Witnesses:
J. O. BRANDT,
KON. KÜLLING.